Sept. 16, 1958 R. E. BEGER 2,852,205
SPINNING REEL
Filed Feb. 1, 1955 5 Sheets-Sheet 1

INVENTOR
Richard E. Beger
BY
John H. Slaccum
ATTORNEY

Sept. 16, 1958 R. E. BEGER 2,852,205
SPINNING REEL
Filed Feb. 1, 1955 5 Sheets-Sheet 2
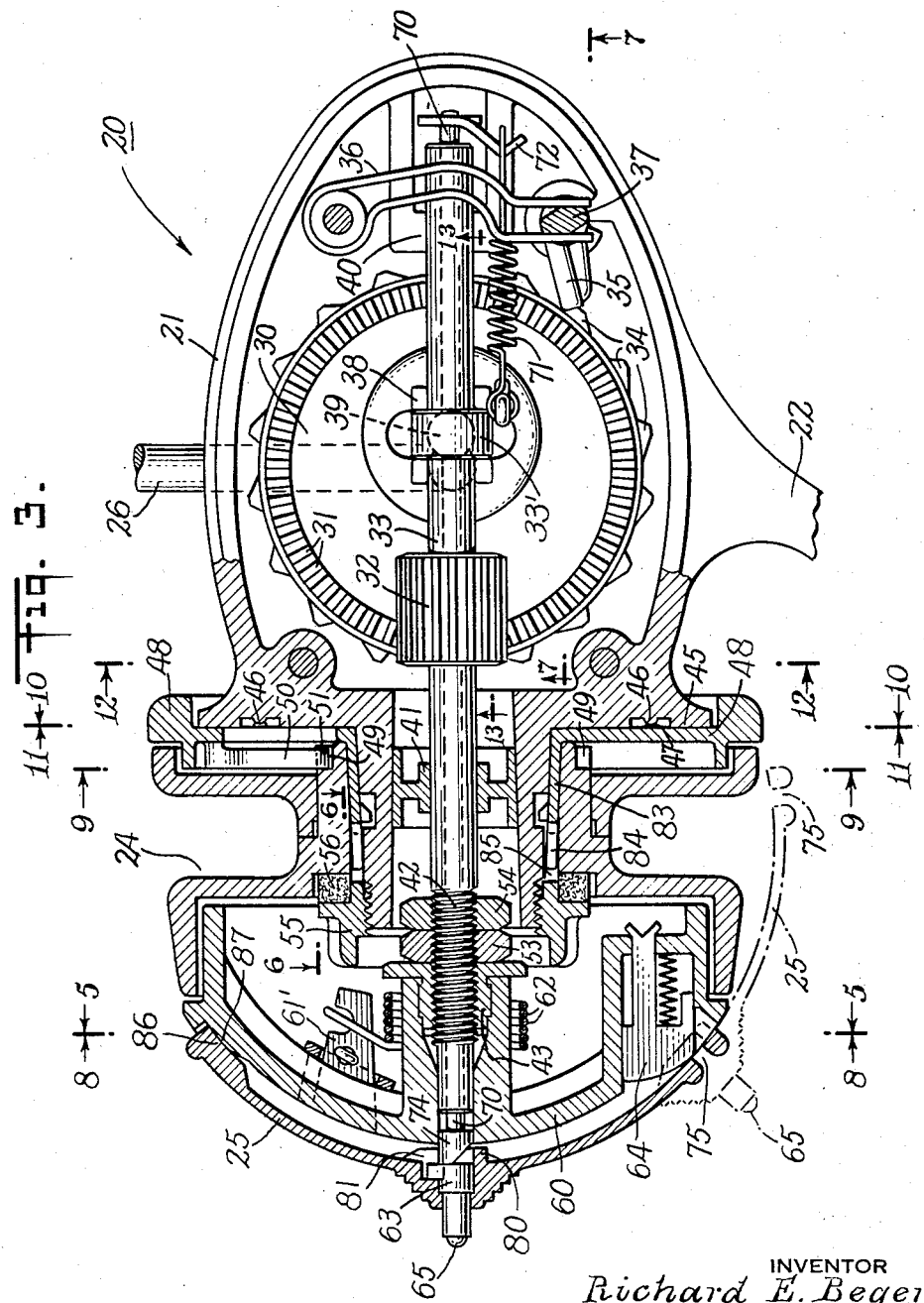
INVENTOR
Richard E. Beger
BY
ATTORNEY Sept. 16, 1958 R. E. BEGER 2,852,205
SPINNING REEL
Filed Feb. 1, 1955 5 Sheets-Sheet 3
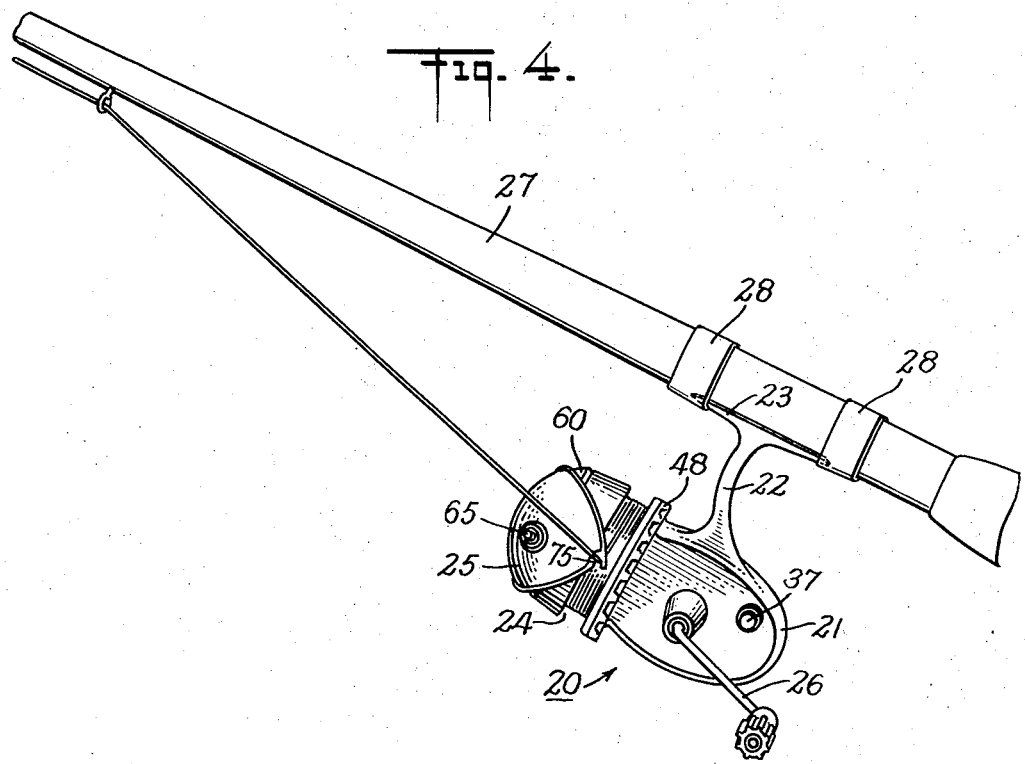
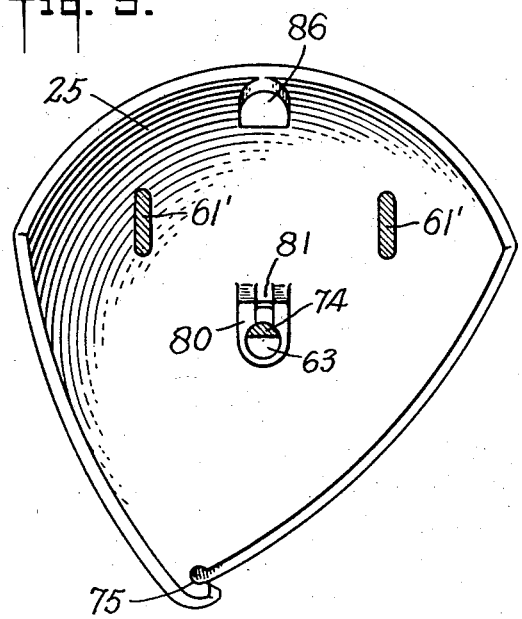
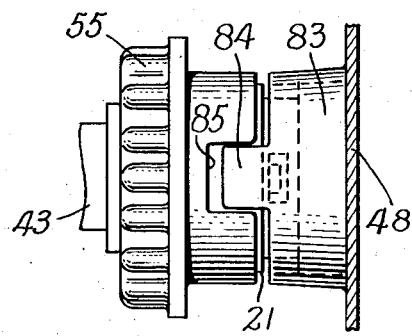
INVENTOR
Richard E. Beger
BY
John F. Slaccum
ATTORNEY Sept. 16, 1958    R. E. BEGER    2,852,205
SPINNING REEL
Filed Feb. 1, 1955    5 Sheets-Sheet 4
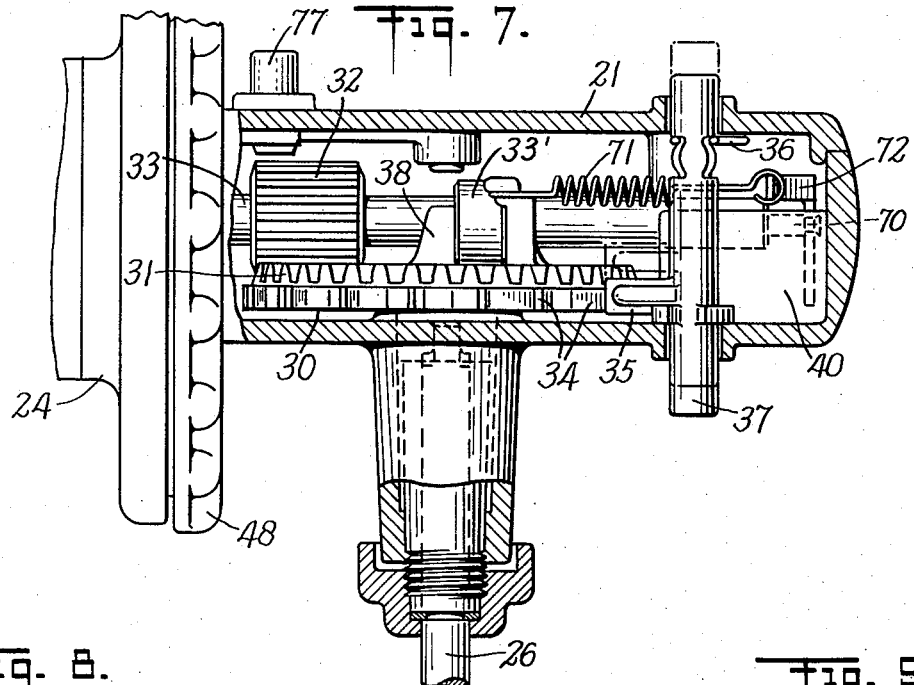
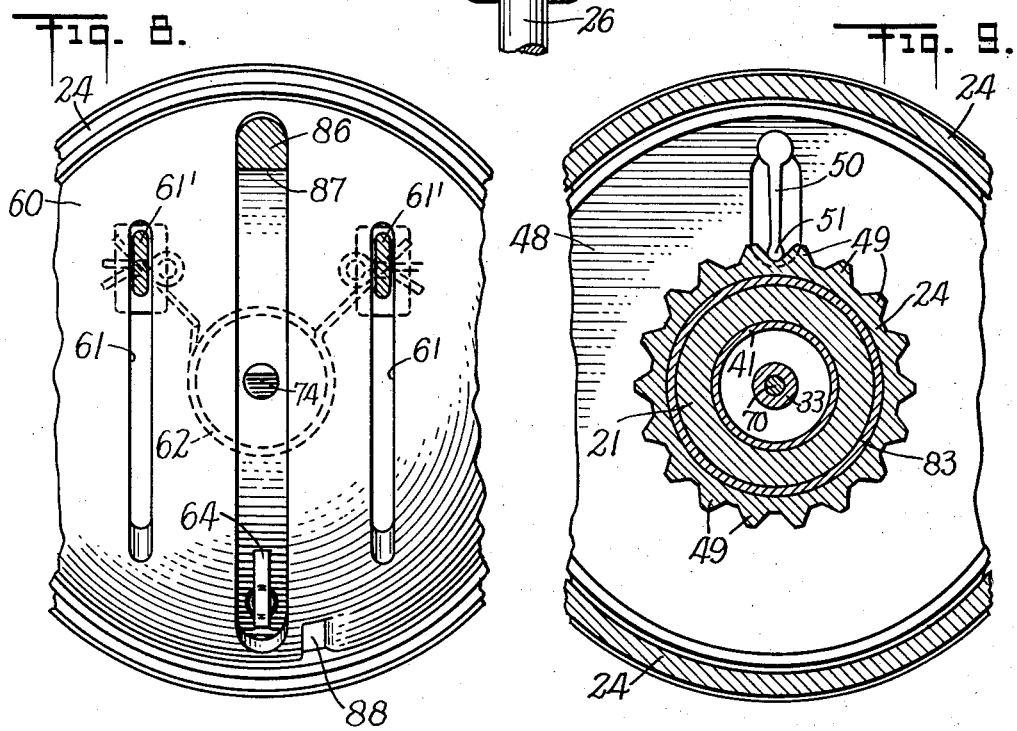
INVENTOR
Richard E. Beger
BY
ATTORNEY Sept. 16, 1958 R. E. BEGER 2,852,205
SPINNING REEL
Filed Feb. 1, 1955 5 Sheets-Sheet 5
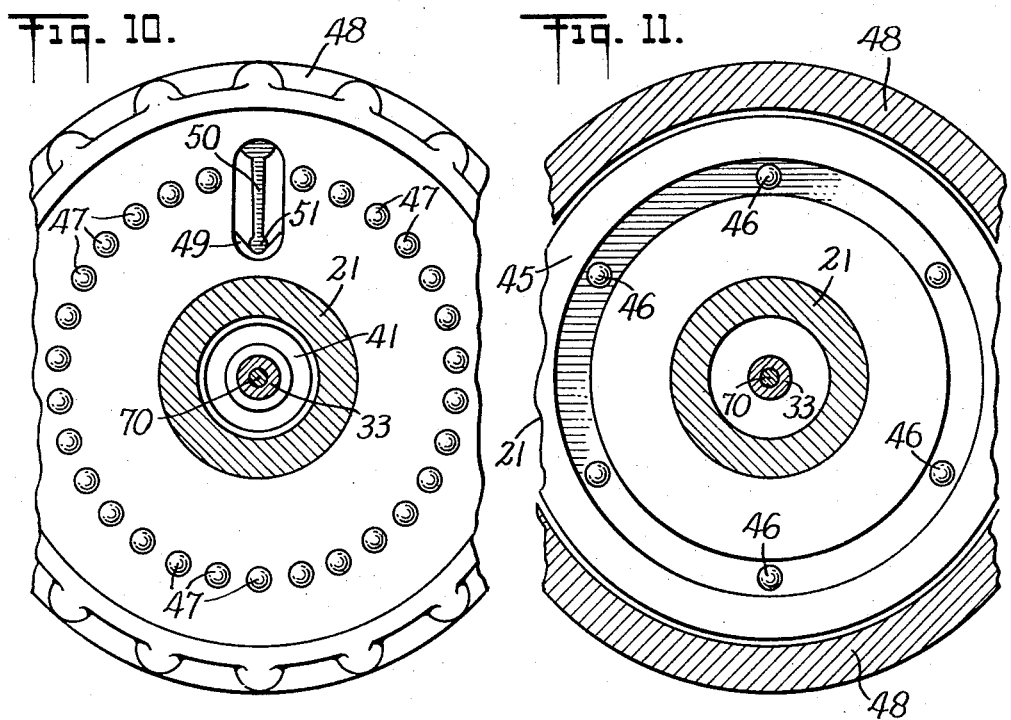
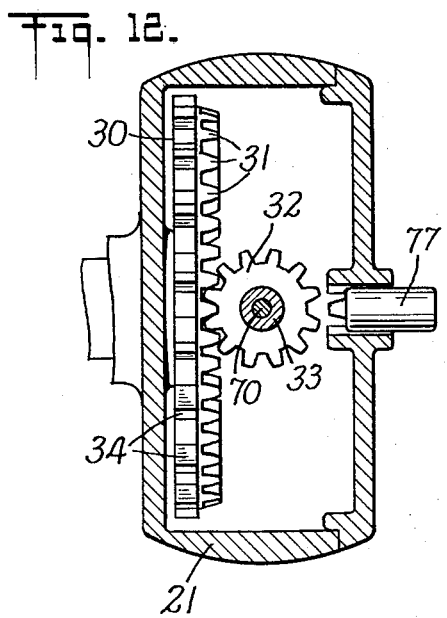
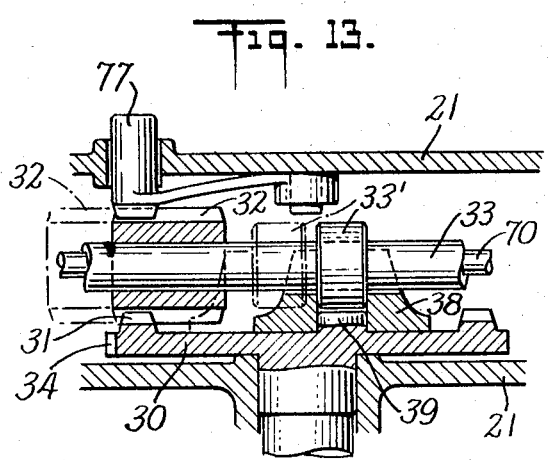
INVENTOR
Richard E. Beger
BY
John V. Glaccum
ATTORNEY

United States Patent Office 2,852,205
Patented Sept. 16, 1958

2,852,205

SPINNING REEL

Richard E. Beger, Jersey City, N. J.

Application February 1, 1955, Serial No. 485,435

7 Claims. (Cl. 242—84.21)

This invention relates to fishing reels and more particularly to the type of reel known as a spinning reel.

An object of the invention is to provide a reel with a new and improved type of retrieve or line pickup.

Another object is to provide a reel which will give an easy, smooth, long cast and which will have a smooth, positive drag conveniently and easily adjustable.

A still further object is to provide a reel which will be light in weight and yet will have ample capacity for line.

Another object is to provide a quickly removable spool which remains stationary during cast and under certain conditions during retrieve.

Other objects and advantages of my invention will appear from the following description and accompanying drawings, in which—

Fig. 3 is a longitudinal cross-sectional view.

Fig. 4 is a side elevation of the reel in position on a rod.

Fig. 5 is a view of the pickup taken on the line 5—5 of Fig. 3.

Fig. 6 is a sectional view taken on the line 6—6 of Fig. 3.

Fig. 7 is a detailed view taken on the line 7—7 of Fig. 3.

Fig. 8 is a sectional view taken on the line 8—8 of Fig. 3.

Fig. 9 is a cross-sectional view taken on the line 9—9 of Fig. 3.

Fig. 10 is a cross-sectional view taken on the line 10—10 of Fig. 3.

Fig. 11 is a cross-sectional view taken on the line 11—11 of Fig. 3.

Fig. 12 is a detailed cross-sectional view taken on the line 12—12 of Fig. 3.

Fig. 13 is a cross-sectional view taken on the line 13—13 of Fig. 3.

Figure 1:
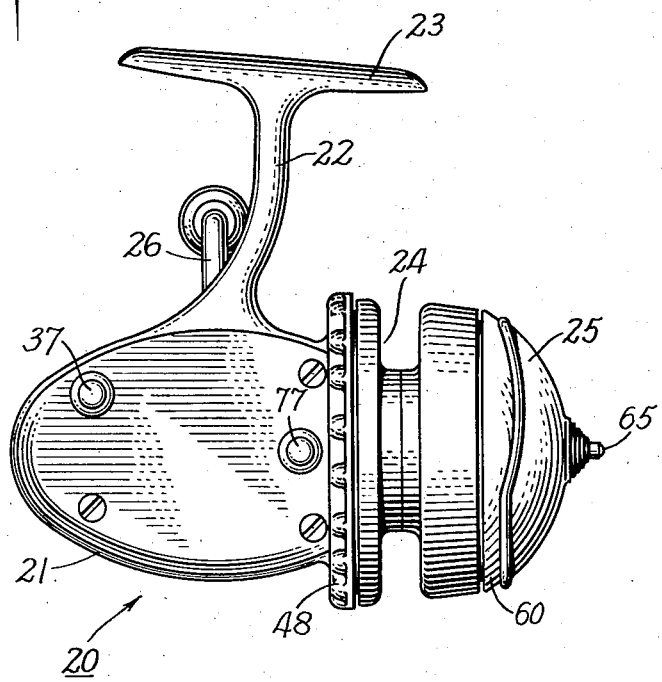
Fig. 1 is a side elevation of a reel embodying my invention.
Figure 2:
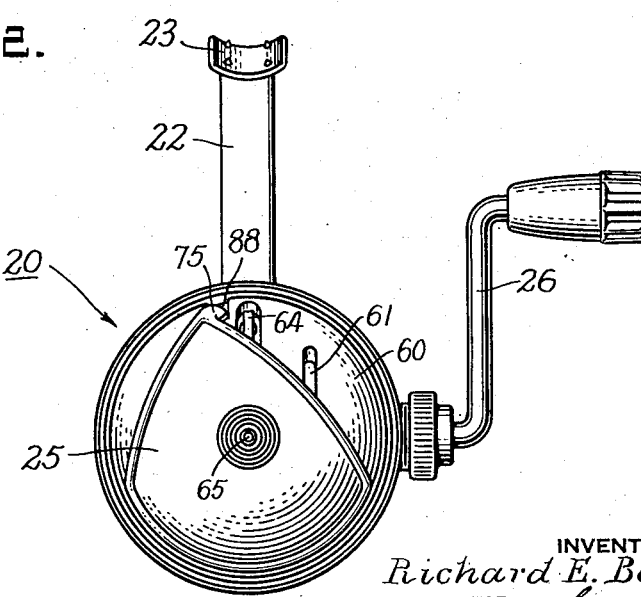
Fig. 2 is an end view thereof.

Referring more particularly to the drawings, I provide a reel 20 which basically has a housing 21, an arm 22 with a section 23 for attaching to a rod 27, a spool 24 and a pickup 25. In addition, there is the handle 26 to operate the reel. The reel 20 may be attached to a rod 27 by means of slip rings 28 in the conventional manner.

The handle engages a gear 30 mounted in the housing 21. The gear 30 has teeth 31 which engage the pinion 32 mounted on the shaft 33. The gear 30 also has ratchet teeth 34 which may be engaged by an anti-reverse pawl 35 controlled by the spring 36 and the button 37. The button 37 is mounted in the housing to slide the pawl in and out of engagement with the ratchet teeth.

Fixed on the shaft 33 is a collar 33' which is engaged by a yoke 38 having a slot which is engaged by the pin 39 mounted on the gear 30. Since the pin is eccentrically mounted, the rotation of the gear 30 will cause the shaft 33 to revolve and reciprocate with the pinion 32 sliding on the teeth 31. The shaft 33 is supported at one end in the housing 40 and intermediate its ends by the bushing 41. At its forwardmost end the shaft is threaded at 42 and engages the cap 60 through threaded bushing 43.

The spool 24 may be made of one or more sections as desired for suitably assembly. The front end 45 of the housing 21 is provided with a series of knobs 46 and these cooperate with similar knobs 47 on the drag plate 48. The pool 24 on its rear face is provided with a plurality of teeth 49, and the front of the drag plate 48 is provided with a resilient member 50, and the end 51 of which is disposed between the teeth to indicate rotation of the spool by a clicking sound.

As previously stated, the end of the shaft 33 is threaded into the threaded bushing 43 and a pair of lock nuts 53 and 54 hold it in place. These nuts provide adjustment so that the cap may be moved forwardly or rearwardly to assure a proper or level winding of the line on the spool.

An annular nut 55 is provided to hold the spool on the foremost end of the housing 21. This nut is provided with slots 85 which engage fingers 84 on the extension 83 of the drag plate 48. The position of the nut 55 and the felt washer 56 determine the amount of friction or drag between the drag plate 48 and the spool 24. Since the fingers 84 engage the openings 85 the amount of friction may be adjusted without dismantling the reel by turning the drag plate 48, thus causing the nut 55 to be threaded on or off the extension of the housing 21.

A cap 60, as shown in Figs. 3, 5 and 8, is provided on the forward end of the reel. This cap has slots 61, and through these slots lugs 61' on the pickup 25 extend. The pickup 25 is urged to slide outwardly by means of a spring 62 to the retrieving position. A reset 63 is provided to release the spring pressed arrester 64 which holds the pickup in the retrieving position once it has oriented there. The pickup is released by means of button 65 which depresses the arrester to release it manually from the pickup.

Mounted within the shaft 33 is a latch rod 70 which is normally urged forward by means of the spring 71 mounted on the yoke member 38 and engaging the guide 72 at the rear of the latch. The guide 72 restricted by a slot in the housing 40 prevents the latch rod 70 from rotating. The end 74 of the latch rod 70 has a cammed or sloped surface. In the casting position the end 74 of the latch rod 70 engages a projection 80 of substantially U-shape on the inside of the pickup 25, as shown in Figure 5, to hold the pickup in the casting position. The projection 80 has an opening 81 through which the arrester 64 passes to engage the pickup in the retrieve position. It also cooperates with the end 74 of the latch rod 70. When the cap is rotated the cammed surface 74 of the latch rod 70 is engaged by the wall of the member 80 forcing it rearwardly by virtue of the spring 62 to release the pickup. The pickup has a notch or hook 75 adapted to engage the line when in the retrieving position.

When the reel is assembled the spool and the drag plate 48 are placed in position and the nut 55 threaded on the end of the housing. The amount of tension on the spool is maintained by the knobs 47 and 46 which come into engagement so that greater or less tension may be secured as desired. Normally, the spool 24 does not rotate, but where the tension on the line is above setting it can rotate and the finger 50 moving through the teeth 49 will give the operator a clicking warning that the tension is more than setting. As shown in Fig. 7 there is provided a locking button 77 which manually engages the pinion 32 to prevent rotation of the shaft for the purpose of unscrewing and removing and/or replacing the retrieve or pickup assembly and the spool as desired.

In normal operation for casing the pickup 25 is moved into center position opposite the shaft 33 and is engaged by the end of the latch rod 74. When the cast is made the line will move freely off the spool until the strike is made or the operator attempts to reel in. When the handle 26 is operated the cammed or sloped end 74 of the latch rod 70 will depress rearward against tension of spring 71 simultaneously passing through the opening 81 and disengaging the pickup which under pressure of the spring 62 will move to the retrieving position where the hook 75 will engage the line. As the handle is operated the entire shaft will rotate and reciprocate, thus moving the entire head of the reel, including the cap 60 and the pickup to play the line evenly or crosswound on the spool. If a fish is caught and it is desired not to allow any more line to come off the spool except through the drag, the anti-reversal pawl 35 can be made to engage the ratchet teeth 34 of the gear 30 to prevent the shaft 33 from rotating. After the line has been reeled in, the arrester 64 is released by pressing the button 65 and returning the pickup back into the casting position, and the operation repeated.

In order to insure that the hook 75 will not project and engage the line when the pickup is in the casting position, I provide a projection 86 on the inside of the pickup 25 which engages a ramp 87 to pivotally force the hook snugly into the recess 88 in cap 60.

I claim:

1. In a reel of the class described having a housing, a shaft rotatably mounted in said housing, a crank on said housing, a pinion on said shaft, a gear engaging said pinion operated by said crank, means for oscillating said shaft longitudinally of said housing comprising an offset on said gear, and a spool mounted on said housing, the improvement which comprises; a cap member on the end of said shaft fixed to rotate and oscillate therewith, a pickup mounted on said cap, spring means urging said pickup into active position, a latch member holding said pickup against said spring means in an inactive position, means on the end of said shaft to release said latch member when said shaft is rotated, a line engaging member on said pickup to engage a line and spread it on said spool when the shaft is rotated, and additional latch means engaging the pickup to hold said pickup in the retrieving position.

2. In a reel of the class described having a housing, a shaft rotatably mounted in said housing, a crank in said housing, a pinion on said shaft, a gear engaging said pinion operated by said crank, means for oscillating said shaft longitudinally of said housing, and a spool bearing a quantity of line mounted on the end of said housing, the improvement which comprises; a cap member on the end of said shaft fixed to rotate and oscillate therewith, a latch member extending through said cap, a pickup mounted on said cap and normally held in an inactive position by means of said latch member, means on the end of said shaft to release said latch member when said shaft is rotated, and a line engaging member on said pickup to engage a line and spread it on said spool when the shaft is rotated.

3. In a reel of the class described having a housing, a crank mounted on said housing, a shaft rotatably mounted in said housing, a pinion on said shaft, a gear engaging said pinion operated by said crank, means for oscillating said shaft longitudinally of said housing comprising an offset on said gear whereby the pinion oscillates on said gear, and a spool bearing a quantity of line mounted on the end of said housing, the improvement which comprises; a cap on the end of said shaft fixed to rotate and oscillate therewith, a latch member extending through said cap, a pickup mounted on said cap and normally held in an inactive position by means of said latch member, means on the end of said shaft to release said latch member when said shaft is rotated, a line engaging member on said pickup to engage a line and spread it on said spool when the shaft is rotated, and an additional latch engaging means to hold the pickup in retrieving position.

4. In a reel of the class described having a housing, a crank mounted on said housing, a shaft rotatably mounted in said housing, a pinion on said shaft, a gear engaging said pinion operated by said crank, and means for oscillating said shaft longitudinally of said shaft housing, the improvement which comprises; a line bearing spool mounted on one end of said housing, a cap bearing a pickup mounted on said shaft and adapted to rotate therewith, a cam shaped latch member extending through said cap, and means on the inside of said pickup to engage said cam shaped latch member to hold said pickup inactive, said means consisting of a U-shaped member having an open end, whereby when the cap is rotated the latch member is disengaged.

5. In a reel of the class described having a housing, a shaft rotatably mounted in said housing, means for oscillating said shaft longitudinally of the housing, and a line bearing spool mounted on one end of said housing, the improvement which comprises; a cap mounted on said shaft to rotate therewith, a pickup having a pair of lugs extending through slots in said cap and spring means urging said cap into the operating position, a latch extending through said cap, a latch engaging member on the inside of said pickup engaging a spring pressed latch, and an opening in said latch engaging means to disengage said latch when said cap and pickup are rotated.

6. In a reel of the class described having a housing, a shaft rotatably mounted in said housing, means for oscillating said shaft longitudinally of the housing, and a line bearing spool mounted on one end of said housing, the improvement which comprises; a cap mounted on said shaft to rotate therewith, a latch member extending through said shaft and said cap, a plurality of slots in said cap and a groove in the surface of said cap, a pickup having operative and retractive positions, a spring urging the pickup into operative position, a latch member to hold the pickup in the retractive position, said pickup having a pair of lugs extending through said slots and affixed thereon, said pickup having a member engaging said groove, an additional groove engaging the end of said pickup when in the retracted position and a raised portion in said first mentioned groove to pivotally force the end of said pickup into close relationship with the second mentioned groove.

7. In a reel of the class described having a housing, a crank on said housing, a hollow shaft mounted in said housing, a pinion on said shaft, a gear engaging said pinion operated by said crank, means for oscillating said shaft longitudinally of said housing comprising an offset on said gear whereby the pinion oscillates and rotates on said gear, and a spool bearing a quantity of line mounted on the end of said housing, the improvement which comprises; a cap member on the end of said shaft beyond said spool fixed to oscillate and rotate with said shaft, a pickup mounted on said cap and normally held in an inactive position by means of a latch member, said latch member comprising a rod extending through said hollow shaft and positioned to oscillate longitudinally with said shaft against spring means but having a stop at its inner end to prevent the rotation of said rod, a cam catch on the opposite end of said rod holding said pickup in an inoperative position against spring pressure and releasing said pickup when said shaft and cap are rotated, and a line engaging member on said pickup operative when said shaft is rotated.

(References on following page)

References Cited in the file of this patent

UNITED STATES PATENTS

| | | |
|---|---|---|
| 1,053,871 | Purdom | Feb. 18, 1913 |
| 2,338,353 | Perkins | Jan. 4, 1944 |
| 2,495,621 | Young et al. | Jan. 24, 1950 |
| 2,558,896 | Young et al. | July 3, 1951 |
| 2,599,189 | Mauborgne | June 3, 1952 |
| 2,600,558 | Mauborgne | June 17, 1952 |
| 2,649,258 | Shelburne | Aug. 18, 1953 |
| 2,690,309 | Cuonz et al. | Sept. 28, 1954 |
| 2,705,113 | Bonnano | Mar. 29, 1955 |
| 2,736,979 | Le Gal | Mar. 6, 1956 |

FOREIGN PATENTS

| | | |
|---|---|---|
| 452,614 | Italy | Oct. 28, 1949 |